United States Patent Office 3,851,042
Patented Nov. 26, 1974

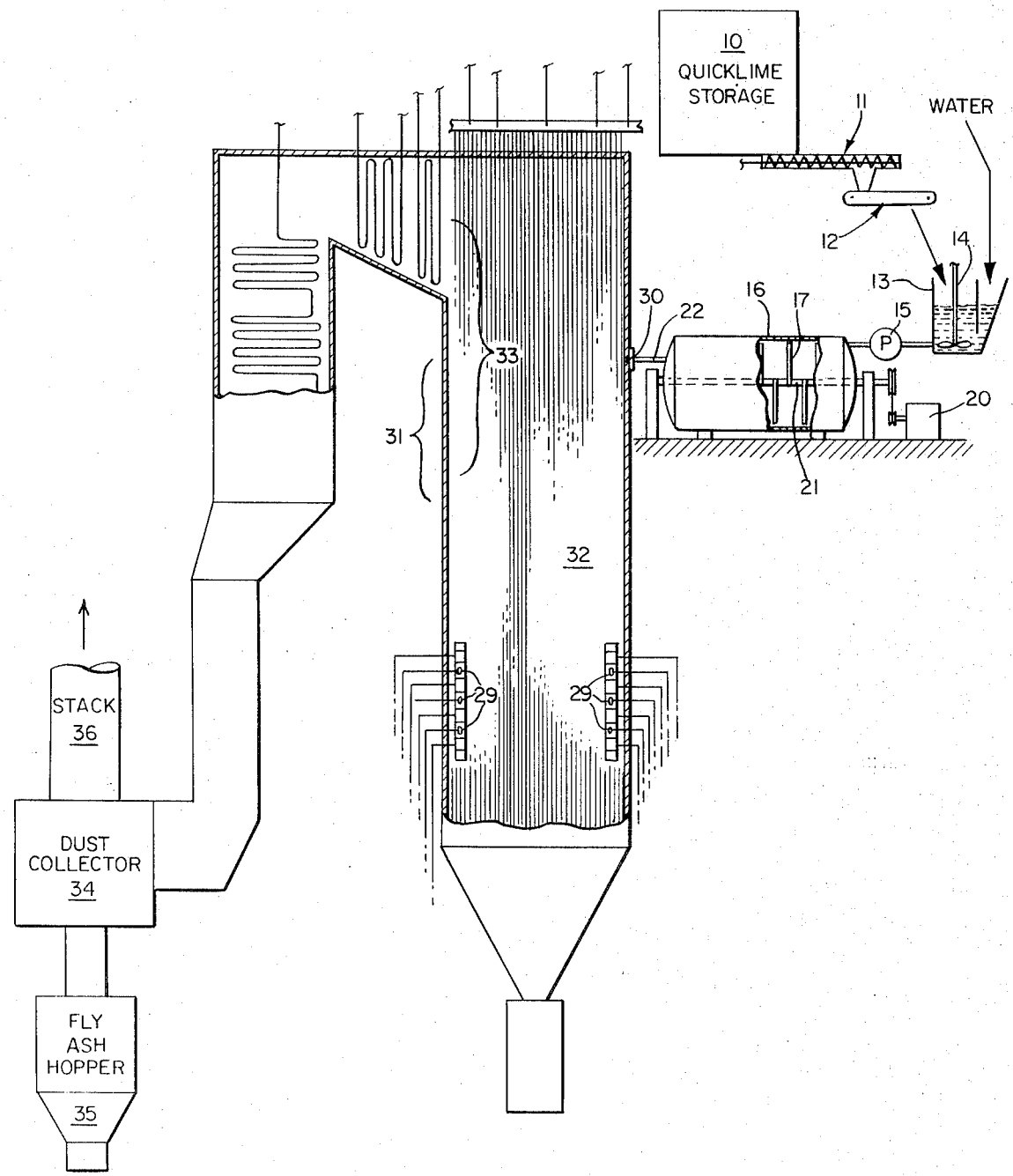

3,851,042
METHOD FOR CONTROLLING AIR POLLUTION
Leonard John Minnick, Cheltenham, Pa., assignor to
Foster Wheeler Corporation, Livingston, N.J.
Continuation-in-part of application Ser. No. 822,824,
June 8, 1969. This application Nov. 23, 1971, Ser.
No. 201,315
Int. Cl. B01d 53/34
U.S. Cl. 423—244
11 Claims

ABSTRACT OF THE DISCLOSURE

Sulphur oxides-bearing stack gas from combustion of coal or oil is treated at elevated temperatures with fully and freshly hydrated lime, more specifically freshly formed dihydrated dolomitic lime and/or hydrated high calcium lime, in the presence of fly ash. When intimately admixed with the hot flue gases, the lime is virtually instantaneously calcined to a nascent finely divided oxide form which reacts rapidly with sulphur oxides in the flue gas. The resulting treated flue gas is relatively sulphur oxides-free. The apparatus for producing the highly dispersed injection of fully and freshly hydrated lime in accordance with the preferred embodiment of the present invention is described.

Brief Summary of the Invention

This is a continuation-in-part of application Ser. No. 822,824, filed Apr. 8, 1969, now abandoned.

This invention relates to apparatus and method for effecting the reaction of sulphur oxides-bearing flue gas resulting from the combustion of coal or oil with fully freshly hydrated lime in the presence of fly ash, in a manner to reduce substantially the sulphur oxide content of the flue gas.

The process in accordance with this invention is also highly advantageous ecologically because it allows effective utilization of the sulphur content thereof thus removed.

Background of the Invention

Recent investigations have indicated that dolomite and high calcium limestones offer some possibility in the treatment of gases containing sulphur oxides as produced in the combustion of coal and oil. The effort to date has been primarily concerned with the injection of the raw limestone (calcite or dolomite, for example) into the fuel or into the furnace so that the high temperature of burning calcines the limestone to form an oxide or mixture of oxides which in turn reacts with the sulphur trioxide and sulphur dioxide in the flue gas. Unfortunately, the attempts to accomplish this have been largely unsuccessful in that substantially higher amounts of limestone are required than the stoichiometric requirement to react with the sulphur oxides. This, therefore, requires high doses of the additive which presents both physical difficulties in the injection process (contaminates the boiler) and economic disadvantages. At best, only 25–30% sulphur oxides removal has been achieved by these techniques; only in unusual circumstances would this result in flue exhaust gases meeting air pollution legislation.

Numerous attempts have been made to inject limestone or quicklime either with the coal or into the combustion zone. When limestone (which will not react with the sulphur oxides itself) is used in this manner it is necessary to convert the limestone to the oxide form by injection into the hotter portion of the boiler; this, however, results in a hard-burning or over-burning of the limestone which drastically interferes with the reactivity of the lime oxides produced. Extremely fast reactivity is needed since only a very short exposure time, of the order of 0.1–5 seconds, for example, is available within a normally operating industrial boiler. Commercial quicklime reacts very poorly with the sulphur-containing ingredients of the flue gas and it is also extremely difficult to inject quicklime into the boiler. Further, it is not possible to slake quicklime in a boiler, because of the substantial reaction time that is required to cause a reaction between quicklime and water, as compared to the reaction time that is available for reacting with sulphur components of the flue gas. Additionally, boiler temperatures would not permit water to remain in the liquid phase necessary for adequate slaking.

Efforts have been made along the lines of introducing pulverized limestone with the coal in a coal burning steam generator, in the hope that the limestone could be calcined at the combustion temperatures that exist within the steam generator, and that the lime oxides thus produced would react with the sulphur components of the flue gas. Not only has this resulted in the over-burning of the lime, as just discussed herein, but it also produces a substantial amount of solid materials resulting from the introduction of the limestone, contaminating the boiler itself.

In prior art systems of the foregoing types, attempts have been made to utilize more fully the lime oxides suspended in the gas stream by capturing them in scrubbers, the purpose of this being to hydrate the unreacted lime and thereby capture any residual sulphur oxides. Such a process results in the formation of substantial quantities of calcium and/or magnesium sulphite which are of questionable value from the standpoint of their utilization in compositions such as mortar, concrete and the like. Since as described above the unreacted lime or oxides are overburned, subsequent hydration is difficult to attain, requiring extended scrubber retention time, which is not available in commercial systems.

There have been reports of some success in desulphurizing flue gases with ordinary lime ("dolomite hydrate"), see, Squires, Chemical Engineering—Nov. 20, 1967, pages 13, 14, citing Wickert, K., "Experiments on Desulfurization Before and After the Burner for Reducing the Release of Sulfur Dioxide," Mitteilungen der VGB, No. 83, April 1963, pp. 74–82 and Wahnschaffe, E., "The Dolomite Method of Desulphurizing Flue Gases," V.J.K.— Berichte, No. 155, August 1964, pp. 20–43. However, there is some doubt as to the effectiveness of the reported methds. The Wahnschaffe article itself, indicates that half of the injected dolomitic material was left in the furnace. A subsequent article, Kruel, J., and Juntgen, H., On the Reaction of Calcined Dolomite and Other Alkaline Earth Compounds With the Sulfur Dioxide of Combustion Gases as Carried Out in a Cloud of Suspended Dust," Chemic Ingenieur Technik, Vol. 39, 1967, pp. 607–613, also cited by Squires, reported that such desulfurization as had been disclosed by Wickert and Wahnschaffe could not be duplicated in a bench scale laboratory apparatus. Kruel and Juntgen suggested that the injected dolomitic material reported by Wahnschaffe to be left in the boiler resulted in long exposure times of flue gases to desulfurant, thus accounting for the high degree of desulfurization. Long residence time of such desulfurants or the presence of an excess of such materials in the boiler is highly impractical, however, from an efficiency and maintenance standpoint.

Applicant herein has also had some limited success with flue gas desulfurization by injection of ordinary lime or dolomitic hydrate. However, far more effective and efficient desulfurization than has heretofore been attained by such methods is necessary for industrial applications of these desulfurization methods. It is to that end that the present invention is directed.

SUMMARY OF THE INVENTION

It has now been discovered that excellent control of air pollution in stack gases resulting from the combustion of coal or oil may be achieved by continuously treating sulphur oxide-bearing stack gases with a finely-divided, freshly and fully hydrated alkaline earth metal hydroxide at a temperature in the range of about 1200°–2400° F. for a reaction period of at least about 0.1 to 5 seconds, in the presence of fly ash particles which are produced in the combustion of the coal or oil. This finely divided freshly hydrated alkaline earth metal hydroxide calcines virtually instantaneously resulting in an extremely rapid reaction with the sulphur oxides bearing bases.

The forms of alkali earth metal hydroxide useful according to this invention are, the substantially fully and freshly hydrated limes, such as dihydrated dolomitic lime and hydrated high-calcium lime and mixtures thereof. Such mixtures may be blended mixes of the individual forms of such hydrated lime in any proportions at all, and may also include calcined and hydrated products of naturally-occurring limestone materials which contain calcium and magnesium in a Ca:Mg weight ratio that falls somewhere between the ratios existing in high-calcium limestone (100:0 to 95:5) and dolomitic limestone (about 65:35 to about 45:55). One specific example of such naturally-occurring materials is "magnesian" limestone, in which the weight ratio of calcium to magnesium carbonates is in the range of about 65:35 to about 95:5, and which can be calcined and hydrated to form a useful material for purposes of this invention. Other examples also exist. It should be pointed out, however, that the alkaline earth metals generally and the magnesium content specifically in such a mix should be substantially fully and freshly hydrated.

By "fully hydrated" is meant that substantially all of the alkaline earth metal oxide in the composition has been converted to the hydroxide form.

By "freshly formed" is meant that the hydrated lime is injected soon, and preferably substantially immediately, after it has undergone the hydration reaction.

Both of the foregoing conditions ensure the desulfurization reactivity of the lime material injected in the process of the present invention. This reactivity is further enhanced if the hydrate is in a finely divided state and is explosively injected into the boiler, for better dispersion therein, along with steam, the explosive release and the steam contributing energy, it is thought, which promotes the desulfurization reaction.

All of the conditions are best met, in accordance with the preferred embodiment of the present invention, by continuously hydrating lime under pressure (mixing lime and water under pressure to produce fully hydrated lime), and continuously injecting the fully hydrated lime and steam produced therein into the boiler flue gases to be desulfurized, all of which is described more fully hereinafter.

Brief Description of the Drawings

The drawing represents schematically a form of apparatus which is useful in practicing the process according to this invention in its preferred form.

Detailed Description of the Invention

The drawing shows, in essence, a pressure hydrator which is connected to inject hydrated lime into a certain region within a steam generator. While the steam generator is normally much larger in relation to the pressure hydrator than it appears in the drawing, its scale has been reduced in order to facilitate an illustration of this invention. The pressure hydrator selected for illustration in the drawing is particularly adapted for producing high calcium hydrate or dolomitic dihydrate, and is shown as a continuously operating hydrator as distinguished from the batch-type hydrator shown in the drawing in the U.S. patent to Bolton L. Corson No. 2,309,168, granted Jan. 26, 1943.

The number 10 designates a quicklime storage chamber which is provided with a feed conveyor 11, shown as a rotating worm-type conveyor, arranged to convey quicklime continuously out of the chamber 10. The number 12 designates a metered conveyor which may be of any conventional type, and which deposits a metered amount of quicklime into a mixing tank 13. Water is introduced into the mixing tank and is mixed with the lime by means of agitator 14. A high pressure pump 15 is arranged to deliver the lime-water slurry continuously to a pressure hydrator chamber 16. A drive motor 20 is connected to the central shaft 21 which carries a plurality of agitators 17 which are arranged to maintain the lime and the steam in movement, and to keep the contents of the pressure hydrator thoroughly mixed. An outlet line 22 is connected from the pressure hydrator to communicate with a particular portion of the combustion space of the steam generator, as will be further described.

A typical example of this process in practice may consist in metering the flow of quicklime and of water such that approximately 300 lbs. of pulverized dolomitic quicklime are mixed with each 227 lbs. of water; this produces a free-flowing slurry which is then pumped into the chamber 16 for hydration and is well adapted to the practice of this invention. Other proportions may, of course, be used.

The steam pressure within the pressure hydrator may be varied within wide limits, but it is preferred to utilize a high pressure, sometimes as high as 600 pounds per square inch or more. However, satisfactory hydration may be achieved at lower pressures, such as 10 pounds per square inch, 20 pounds per square inch, or 100 pounds per square inch, for example. It will be appreciated that it is important in accordance with the preferred form of this invention to provide a continuous internal pressure within the pressure hydrator which is sufficient to blast the substantially solid hydrated lime with explosive force to the exit pipe 22 of the hydrator so that the lime, admixed with steam from the pressure hydrator, is instantly and violently dispersed throughout the large space that exists within the combustion zone of the steam generator.

The number 30 designates an opening in the wall of a steam generator 31 having fuel burners 29 arranged in a combustion space 32 having a region 33 in which the flue gas temperature is in the range of about 1200° F.–2400° F. The number 34 designates a dust collector (usually electrostatic and/or mechanical) which is conventional per se, and which separates fly ash and calcium and/or magnesium sulfur compounds, along with excess lime, from the desulphurized flue gases. The fine solids are collected into a hopper 35 while the desulphurized flue gases pass out stack 36.

The term "fly ash" as used in the present specification is intended to indicate the finely divided ash residue produced by the combustion of pulverized coal or oil. This ash is found suspended as minute particles in the boiler, and is eventually carried off with the gases exhaustd from the boiler and collected from these gases usually by means of suitable precipitation apparatus such as mechanical or electrostatic precipitators. Generally, fly ash is known to be a pozzolan, i.e. finely divided amorphous aluminosiliceous glass particles in the fly ash react with added calcium and magnesium oxide (or hydroxides) to develop cementitious compounds. In the case of the fly ash produced as a result of the process of this invention, large quantities of calcium and magnesium compounds are present as the oxides, sulfates, and complex sulfo-aluminates. This fly ash has novel sulfozzolanic properties as disclosed in my co-pending application, U.S. Ser. No. 780,902 filed Dec. 3, 1968. Thus, this invention has both ecologic and economic significance. The former because it has the potential for effecting a great reduction in the quantity of sulfur oxide emissions from various types of combustion equipment and the latter because of the enhanced usefulness of the fly ash by-products of such equipment.

The method of controlling air pollution according to this inveniton involves the injection of the special hydrated lime into the steam generator at a particular temperature range under conditions that provide for reaction of at least a substantial part of the hydrated lime with the sulphur oxide gases in the presence of semimolten fly ash. As stated, one excellent form of lime is dolomitic di-hydrate which may be represented approximately by the formula $Ca(OH)_2 \cdot Mg(OH)_2$. Fully hydrated high-calcium lime ($Ca(OH)_2$) may also be used. As previously stated, mixtures of hydrated 'magnesian" lime or equivalents may be used, provided such mixtures are substantially fully hydrated.

If one starts with naturally occurring limestone and treats boiler flue gases according to this invention in its preferred form, it is important first to calcine limestone in a conventional lime kiln or otherwise, outside of the furnace, thus preliminarily eliminating all or a substantial part of the carbonate content of the limestone, second to hydrate fully the resultant quicklime in a pressure vessel as described above, and third to introduce substantially immediately the hydrated lime (uitlizing the steam generated by the exothermic hydration reaction within the pressure vessel to inject, in a highly dispersed condition, the resultant fully hydrated lime) into the coal or oil furnace at a temperature preferably in the range of about 1200° F. to 2400° F. within the furnace. These particular steps in the prior treatment and injection of the special hydrate result in an extremely quick reaction between the sulphur content of the coal or oil combustion product and the freshly formed alkali earth metal oxide content of the lime, thus producing a dry product which can be removed from the boiler and which can be handled quite readily.

Parenthetically, it should be noted, in the preferred form of the present invention that the steam required for injection of a fine dispersion of the alkaline earth metal hydroxides into the boiler is usually generated totally by the exothermic quicklime/water reaction in the pressure hydrator; no external, costly equipment is necessary.

It is highly preferred according to this invention that the hydrated lime be made up of particles not exceeding about 5 microns in size and preferably of a size not to exceed about 1 micron. The surface area of the material is preferably of the order of about 30,000 sq. cm./gm. or greater. The preferred type of fully hydrated lime for the process is that special material produced from quicklime formed in the lime kiln described in U.S. patent to Bolten L. Corson et al., No. 3,250,520. Such a quicklime has abnormally high reactivity and when converted to a dihydrate demonstrates superior features when utilized in the process of the invention. Furthermore, continuous production and injection of di-hydrated dolomitic lime (such as is described in the U.S. patent to Bolten L. Corson, No. 2,309,168) along with the steam generated in the pressure hydrator has been found to be most effective in carrying out the desulfurization reaction in the boiler.

Injection of freshly formed di-hydrated dolomitic lime or hydrated high-calcium lime causes these limes to give up water of hydration substantially instantaneously upon contacting flue gases at about 1200° F.–2400° F., leaving their alkali earth metal oxides in a very finely divided condition and in a nascent or highly reactive state, thus permitting or causing an extremely fast combination reaction with the sulphur oxide-containing flue gases. The preferred form of the present invention is highly dependent on this characteristic of these materials.

It is believed that some of the ingredients of fly ash, particularly vanadium oxides and iron oxides, function catalytically and have a significant influence in achieving the extremely fast reactions that occur particularly because of the finely divided and highly dispersed condition of the freshly formed alkali oxides that are in contact with the molten ash.

It is also believed that the presence of water in the gaseous phase (such as superheated steam produced in the pressure hydrator and introduced along with the lime) may have a significant influence in achieving the extremely fast reactions that occur.

The reaction in the boiler is temperature-limited and the injection of the hydrated lime material must be made at a point in the boiler where the temperature is in the range of about 1200° F. to about 2400° F. Temperatures substantially below about 1500° F. will not ordinarily result in a suitable reaction, particularly insofar as the magnesium oxide content of the injected lime material is concerned. Where high calcium material is used, or where the magnesium content is low, the temperature may be dropped several hundred degrees below 1500° F. with reasonably satisfactory performance.

As mentioned, one other factor of importance is that the reactant material must be dispersed throughout the gases of combustion in the boiler in a manner to provide intimate contact between the nascent finely-divided lime oxide particles and the gas stream. The pressure hydration with subsequent explosive injection into the boiler, as described above, results in this type of intimate contact.

The flue gas obtained according to this invention has a low sulphur oxides content, consistent with the relative proportions of hydrated lime used in the treatment, and the amount of sulphur originally present in the fuel. Indeed, it is possible to control the amount of resultant sulphur oxides-bearing gas in the effluent flue gas by controlling the rate of injection of hydrated lime into the flue gas. While the reaction does not achieve stoichiometry, the reaction efficiency is so high that it is often possible to obtain substantially complete sulphur oxides removal by using only slightly more than the stoichiometric proportion of lime. Further, in certain locations, local laws do not require complete sulphur oxides removal under all weather conditions. The process according to this invention is very flexible and advantageous from this point of view, since sulphur oxides can be removed with varying degrees of completeness, depending upon the immediate requirements of weather conditions, location, local law and the like. As an example, the relative feed of lime can be reduced to one-half the normal feed, or even less, on days when increased quantites of sulphur oxides-bearing gases can be tolerated from the stack.

In accordance with this invention, in the reaction stage involving the reaction of the lime in the presence of the fly ash, the preferred reaction temperature is about 1800° to about 1900° F., at a reaction time which totals approximately 1–3 seconds, ideally about 2 seconds. This differs drastically from the reaction temperatures and times that are obtained in portland cement kilns and other types of industrial furnaces, where the reaction products are formed at about 2800° F.; and the reaction time is usually in the neighborhood of about 20–30 minutes.

While this invention has been described with reference to many specific embodiments, it is to be understood that these examples are intended to be illustrative and not to limit the scope of the invention, which scope is defined in the appended claims. It should be emphasized that it is not necessary to use the hydrated lime alone, but that it can be combined with other materials without disadvantageous effects, provided those other materials do not interfere with the reactivity of the lime with the sulphur oxides-bearing gases in the presence of fly ash. Examples of materials that can be added are magnesia, ordinary fly ash, lime in forms other than hydroxide, vanadium oxides, iron oxides, pulverized limestone and the like.

Further, the expression "alkali earth metal hydroxide" as used in the claims is intended to include pure and impure compounds and combinations thereof, which include hydrated oxides of calcium and/or magnesium calcium.

Following are two examples demonstrating and illustrating the present invention.

EXAMPLE 1

To compare the desulfurization of boiler flue gases with fully hydrated limes and with conventionally hydrated lime, a series of coal-fired boiler sulfur removal tests was performed using actual boiler gases from a 180 megawatt pulverized coal-fired boiler. The tests were conducted on a sidestream basis; the temperature of the boiler gases being drawn through the test apparatus was maintained at approximately 1500–1900° F. by the application of external heat. Freshly formed hydrated lime was injected in slurry form through a simulated pressure feed system, resulting in a contact time of 1.0 to 1.5 seconds with the boiler gases at the reaction temperature.

Reaction efficiencies were monitored by collecting the fly ash-lime residues and submitting them to compound analysis by X-ray diffraction. In this way the relative peak heights of the $CaSO_4$ and $CaO$ present in the residue are used as a measure of the extent of the reaction, with high $CaSO_4/CaO$ peak height ratios corresponding to high reaction efficiency. Results comparing common dolomitic hydrate (incompletely hydrated dolomitic lime) with fully hydrated dolomitic and high calcium limes were obtained.

Representative data points considered to be indicative of the enhanced desulfurization efficiency of fully hydrated, as compared to less than fully hydrated (conventional dolomitic hydrated) limes are shown in the following table.

and weight feeder 12 to a slurry mixing tank 13 where it is mixed with 6.5 gallons per minute of water and pumped into pressure hydrator 16 where the hydration reaction proceeds exothermically with the evolution of considerable heat. The steam-dihydrated dolomitic lime mixture discharges from the hydrator 16, under a pressure of about 100 p.s.i., built up in the hydrator by the exothermic reaction, through a distributing pipe system 22 and is injected into the furnace through a series of orifices 30 which are set in four preselected locations. The distributing pipe system 22 is heated electrically in order to prevent condensation and sticking of the lime. The freshly formed dihydrated dolomitic lime hydrate reacts with the $SO_3$, $SO_2$ (and $O_2$) in the combustion zone of the boiler 33 where it remains for approximately 1.5 seconds at a temperature range between 1200° F. and 2000° F. The reacted lime and the fly ash then pass from the boiler 32 into an electrostatic dust collector wherein the reacted lime is collected with the fly ash in fly ash hopper 35 and the clear exhaust gases are released to the atmosphere through stack 36.

Based on experience in the above-mentioned side stream experiments similating the foregoing process, such a quicklime charge would remove 80% of the $SO_2$ from the stack when the boiler is operating at 100% capacity, the lime hydrate efficiency is 80% (proportion alkaline earth oxide or hydroxide converted to sulfate), and the coal contains 3% sulfur.

When it is necessary to adjust the process to meet the operating conditions of the boiler, the sulfur content of the coal, and the desired $SO_2$ removal efficiency, the rate at which the quicklime slurry is fed into the pressure hy-

| Type lime | Reaction temp. | $CaSO_4$, c.p.s.* | CaO, c.p.s.* | $CaSO_4/CaO$ ratio | Percent $SO_3$ |
|---|---|---|---|---|---|
| Run number: | | | | | |
| 1............ Common dolomitic hydrate............ | 1,550 | 28 | 100 | 0.3 | 4.4 |
| 2............ ......do............................... | 1,650 | 49 | 135 | 0.4 | 3.5 |
| 3............ Fully hydrated dolomitic............ | 1,660 | 232 | 30 | 7.7 | 26.9 |
| 4............ ......do............................... | 1,630 | 440 | 128 | 3.4 | 29.5 |
| 5............ Fully hydrated high calcium........ | 1,690 | 320 | 288 | 1.1 | 24.7 |

* Counts per second of indicated compound as determined by X-ray diffraction analysis (all tests performed with same diffractometer settings).

EXAMPLE 2

The dolomitic quicklime used for injection purposes in a 100 megawatt steam generating utility boiler has the following typical chemical and sieve analysis:

TYPICAL ANALYSES

| | Percent |
|---|---|
| CaO | 55.0 |
| MgO | 44.0 |
| Total Oxides | 95.0 |
| L.O.I. ($CO_2$,$H_2O$) | 2.0 |
| $SiO_2$ | 1.5 |
| $R_2O_3$ | 1.2 |
| Thru #10 Mesh | 90 |
| Thru #20 Mest | 75 |
| Thru #30 Mesh | 65 |
| Thru #60 Mesh | 50 |

This dolomitic quicklime passes all the requirements of ASTM specification C–5.

Typically, this quicklime would be delivered in bulk, by truck or rail, and unloaded and transported to a storage tank, such as that identified in the accompanying drawing as item 10, at a rate of approximately 10 tons/hour by a conventional type pneumatic transport system. As an illustration of typical flow rates in a projected full scale system based on certain side stream experiments, this quicklime would then be fed from the bottom of storage tank 10, having a 60 ton storage capacity, at a rate of 72 pounds per minute through rotary feeder 11 drator will vary as indicated by the following tabular information.

QUICKLIME FEED RATES* FOR COALS OF VARYING SULFUR CONTENT

[lb./hrs.]

| | Boiler operating rate (percent of capacity) | | | |
|---|---|---|---|---|
| | 40% | 60% | 80% | 100% |
| Coal use rate (lb./hr.) | 38,400 | 57,600 | 76,800 | 96,000 |
| 1% sulfur coal | 720 | 1,080 | 1,440 | 1,800 |
| 2% sulfur | 1,440 | 2,160 | 2,880 | 3,660 |
| 3% sulfur | 2,160 | 3,240 | 4,320 | 5,400 |
| 4% sulfur | 2,880 | 4,320 | 5,760 | 7,260 |

*Lime hydrate used, 80% reaction efficiency (proportion alkaline earth oxides and hydroxides converted to sulfate).

The following is claimed:

1. In a method of desulphurizing flue gas produced from combustion of a fuel selected from the group consisting of coal and oil, the steps which comprise burning said fuel under conditions which produce finely-divided fly ash particles and sulphur-bearing ingredients in the flue gas, continuously mixing quicklime and water and forcing said mixture into high pressure intimate contact, thus causing a reaction to take place under pressure with development of steam and production of a fully hydrated lime and continuously injecting a stream of said fully hydrated lime and said steam under pressure, while said line is still in its freshly formed state into the aforesaid flue gas while said flue gas is at a temperature of about 1200° F.–2400° F.

2. In a method of desulphurizing flue gas, as recited in claim 1, wherein said injected fully hydrated lime is maintained in reactive contact with said flue gas for a period of about 0.1–5 seconds at said temperature of about 1200° F.–2400° F.

3. The method defined in claim 1, wherein said quicklime is calcined high calcium limestone.

4. The method defined in claim 1, wherein said quicklime is calcined dolomitic limestone.

5. The method defined in claim 1, wherein said fully hydrated lime has an average particle size which is less than about 5 microns.

6. The method defined in claim 4, wherein said average particle size is less than about 1 micron.

7. The method defined in claim 4, wherein the average surface area of said fully hydrated lime is greater than about 30,000 square centimeters per gram.

8. The method defined in claim 1 wherein the reaction temperature is in the range of about 1800° F.–1900° F.

9. The method defined in claim 1, wherein the reaction time is about 1–3 seconds.

10. The method defined in claim 1, wherein the reaction time is about 2 seconds.

11. A method of desulphurizing flue gas, as recited in claim 1, wherein said injected steam and fully hydrated lime are explosively released as an admixture from said pressure reaction of said quicklime and said water into said flue gas.

References Cited

UNITED STATES PATENTS

| | | | |
|---|---|---|---|
| 2,210,405 | 8/1940 | Haywood | 423—512 |
| 3,475,121 | 10/1969 | Thornton | 423—244 |
| 2,073,039 | 3/1937 | Wilton et al. | 423—242 |
| 3,474,207 | 6/1949 | Lovell | 423—635 |
| 2,718,453 | 9/1955 | Beckman | 423—512 X |

OTHER REFERENCES

Squires, A. M., "Chemical Engineering," Nov. 20, 1967, pp. 133–40.

Weintraub et al., "Journal of Engineering for Power," October 1961, pp. 444–450.

Knibb, N. V. S., Lime & Magnesia, Van Nostrand Co., New York, 1924, pp. 49, 50–57.

GEORGE O. PETERS, Primary Examiner

UNITED STATES PATENT OFFICE
CERTIFICATE OF CORRECTION

Patent No. 3,851,042  Dated November 26, 1974

Inventor(s) Leonard John Minnick

It is certified that error appears in the above-identified patent and that said Letters Patent are hereby corrected as shown below:

Col. 2, line 47, "methds" should be --methods--,

Col. 5, line 15, " 'magnesian" " should be --"magnesian",

Col. 5, line 54, "Bolten" should be --Bolton--,

Col. 5, line 59, "Bolten" should be --Bolton--,

Col. 7, line 52, "44.0" should be --40.0--,

Col. 7, line 60, "Mest" should be --Mesh--.

Signed and sealed this 18th day of March 1975.

(SEAL)
Attest:

RUTH C. MASON
Attesting Officer

C. MARSHALL DANN
Commissioner of Patents
and Trademarks